United States Patent
Miles et al.

(10) Patent No.: US 6,472,657 B1
(45) Date of Patent: Oct. 29, 2002

(54) LASER SYNCHRONIZED HIGH-SPEED SHUTTER FOR SPECTROSCOPIC APPLICATION

(75) Inventors: Paul C. Miles; Eldon L. Porter, both of Tracy; Thomas L. Prast; Duane A. Sunnarborg, both of Livermore, all of CA (US)

(73) Assignee: Sandia Corporation, Livermore, CA (US)

( * ) Notice: Subject to any disclaimer, the term of this patent is extended or adjusted under 35 U.S.C. 154(b) by 0 days.

(21) Appl. No.: 09/594,663

(22) Filed: Jun. 15, 2000

(51) Int. Cl.$^7$ ................................................ G01D 5/34
(52) U.S. Cl. .................. 250/231.15; 396/167
(58) Field of Search ................................. 250/232, 233, 250/231.13, 231.14, 231.15, 231.16, 231.17, 231.18; 396/167, 181–184

(56) References Cited

U.S. PATENT DOCUMENTS

| | | | |
|---|---|---|---|
| 4,473,285 A | * 9/1984 | Winter | 354/403 |
| 4,954,714 A | 9/1990 | Pollack et al. | 250/458.1 |
| 4,958,231 A | 9/1990 | Tsuchiya | 348/215 |
| 5,357,343 A | 10/1994 | Lowne et al. | 356/418 |
| 5,391,870 A | 2/1995 | Purser | 250/298 |
| 5,457,530 A | 10/1995 | Yoshiroh | 356/330 |
| 5,815,754 A | * 9/1998 | Balling et al. | 396/403 |
| 5,920,739 A | 7/1999 | Piper et al. | 396/483 |
| 6,035,148 A | * 3/2000 | Jehan | 396/563 |

OTHER PUBLICATIONS

Legrand, A.D.; Schildkamp, W.; Blank, B.; "An Ultrafast Mecnanical Shutter for X–rays," Nuclear Instruments and Methods in Physics Research A, vol. 275 (1989) pp. 442–226.

Comtois, S.; Gagne,S.; "High–speed electromechanical shutter for vision research" Medical & Biological Engineering & Computing, vol. 36, (Sep. 1998) pp. 627–629.

Miles, P.C.; Barlow, R.S.; "A fast mechanical shutter for spectroscopic applications," Measurement Science & Technology, vol. 11, No. 4, pp. 392–397 (Apr. 2000).

* cited by examiner

Primary Examiner—Robert H. Kim
Assistant Examiner—Jurie Yun
(74) Attorney, Agent, or Firm—Timothy Evans (57) ABSTRACT

A fast mechanical shutter, based on rotating chopper wheels, has been designed and implemented to shutter the entrance slit of a spectrograph. This device enables an exposure time of 9 $\mu$s to be achieved for a 0.8 mm wide spectrograph entrance slit, achieves 100% transmission in the open state, and an essentially infinite extinction ratio. The device further incorporates chopper wheel position sensing electronics to permit the synchronous triggering of a laser source.

19 Claims, 11 Drawing Sheets

LASER SYNCHRONIZED HIGH-SPEED SHUTTER FOR SPECTROSCOPIC APPLICATION

STATEMENT OF GOVERNMENT INTEREST

This invention was made with Government support under contract no. DE-AC04-94AL85000 awarded by the U.S. Department of Energy to Sandia Corporation. The Government has certain rights in the invention.

BACKGROUND OF THE INVENTION

An improved mechanical shutter is described which has applications in optical systems designed for point or line-imaging measurements. The shutter described has a fairly short exposure time (~9 $\mu$s), 100% throughput, and essentially zero leakage in the closed state.

The shutter described herein is particularly well suited for spectroscopic applications, in which it replaces the front entrance slit of a spectrograph. Implementation of this shutter permits the use of non-intensified detectors for spectrographic applications in which continuous background radiation must be significantly reduced. Non-intensified detectors have better quantum efficiency, linearity, and dynamic range than their intensified counterparts.

PRIOR ART

It is well known that photographic exposure of a photographic material is achieved by the combined effect of image intensity and the time this energy is allowed to act on the photographic material. Accurate control of the duration for which energy is allowed to act on the photographic material is therefore important. Shutter mechanisms are used to effect this control.

Shutter mechanisms can be categorized in accordance with their positioning within the camera, for example, front shutters, 'between-lens' shutters and focal plane shutters. Most modern cameras employ a type of 'between-lens' shutter.

In its simplest form, the 'between-lens' shutter is a sector shutter comprising a circular metal plate with an elongated aperture. The metal plate is positioned perpendicular to the light path and makes one rotation when operated. Speed is controlled by a simple spring which is usually tensioned by a part of a release lever. Sector shutters are inexpensive and are often fitted to cheap cameras where inconsistencies which develop over a period of time and the limited speed range are not important.

The most commonly used type of photographic shutter is the bladed or diaphragm shutter. This type of shutter comprises three to five thin metal blades which open and shut across the light path. The blades are designed to minimize the time taken for opening and closing during the exposure cycle. Each shutter blade is pivoted at its outer edge and linked to a ring which is rotated to open the blades. Power for this rotation comes from a main driving spring which is tensioned prior to the shutter being activated. Diaphragm shutters are compact and offer a wide range of speeds.

These types of mechanical diaphragm shutters, however, are limited to speeds above several hundred microseconds. Furthermore, their repetition rate is dependent upon the arming cycle on the tensioning spring. An apparatus using this type of shutter, therefore, is usually directed to "single-event" applications.

For continuous and repetitive observations where high time resolution is necessary the use of a "chopper" as a shutter to limit the time duration for light admittance into a camera is well known. An example is shown in U.S. Pat. Ser. No. 4,954,714 to Pollak, et al.

In comparison, competing technology, based on ferroelectric liquid crystal retardation plates, results in shutters with exposure times on the order of 40 $\mu$s, only about 40% throughput, and approximately 0.03% leakage (due to the continuous background luminosity in flames, even small leakage can integrate to a large spurious signal).

SUMMARY OF THE INVENTION

Accordingly, it is an object of the invention to provide a spectrometer provided with an optical shutter which has overcome the problems residing in the prior art.

It is another object of the invention to provide a spectrometer provided with an optical shutter which is capable of increasing the switching speed of the optical shutter, thereby enabling a high speed response.

It is yet another object of this invention is to provide a shutter capable of exposure times on the order of 10 microseconds while simultaneously providing 100% light admittance while open and near 0% light admittance when closed.

It is yet another object of this invention to provide a shutter which provides for synchronization with a separate light source, or other peripheral device, and which provides a means for determining the actual exposure time at the operating conditions employed.

Additional objects and advantages will become apparent to those having skill in these arts as the description and claims are reviewed.

BRIEF DESCRIPTION OF THE DRAWINGS

The accompanying drawings, which are incorporated into and form a part of the specification, illustrate a general, preferred embodiment of the present invention and, together with the description, serve to explain the principles of the invention. The drawings are intended to be used only for the purpose of illustration and are not to be construed in any way as limiting the scope of the invention described herein. In the drawings.

DETAILED DESCRIPTION OF THE INVENTION

The design of a fast, rotating shutter which is appropriate for spectroscopic line-imaging applications is described below. Implementation of a fast shutter permits the use of non-intensified detectors, which have significantly better quantum efficiency, linearity, and dynamic range than their intensified counterparts. The shutter described has a fairly short exposure time (~9 μs), 100% throughput, and essentially zero leakage in the closed state. For comparison, the closest competing technology is based on ferroelectric liquid crystal retardation plates, which result in shutters with exposure times of order 40 μs, 40% throughput, and approximately 0.03% leakage. Due to the continuous background luminosity in some applications, in particular, with flames, even small leakage can integrate to a large spurious signal.

For continuous, repetitive observations, the shutter provides timing signals for synchronization with an external light source, usually a laser typically operating at a 10 Hz pulse frequency, or other peripheral equipment. The timing signals also provide the basis for determining the shutter speed or effective exposure time.

The device described below has been successfully operated in the laboratory for over 30 operating hours; continuously for up to 8 hours. During this time no malfunctions or significant drifts in timing were observed. It should be noted, however, that while opportunities exist for refinement in many areas the device described is the current best mode envisioned in the instant invention.

General Design and Mechanical Layout

Figure 1A:
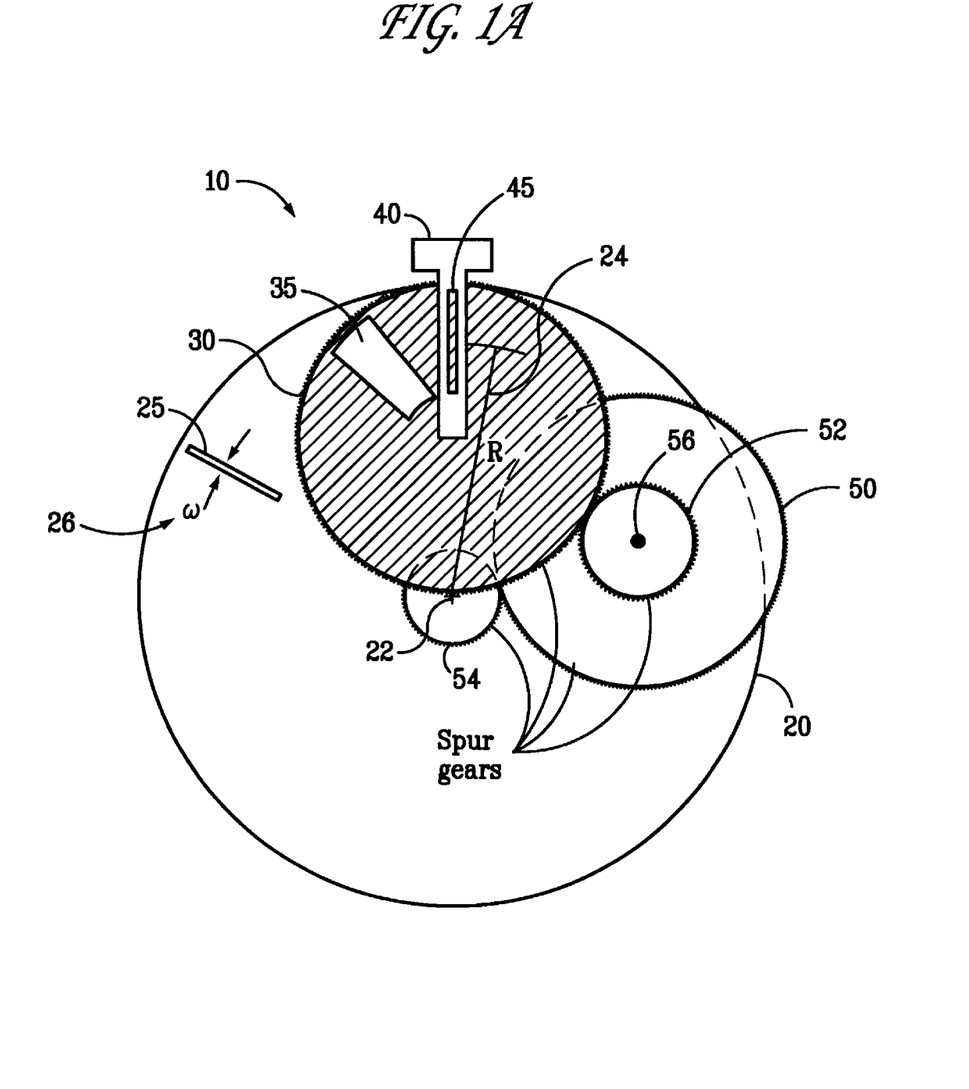
FIG. 1A. Illustrates a schematic of the high speed and low speed wheels and their relationship to one another and to the stationary mask.

The basic mechanical layout of the shutter 10 of the instant invention is shown in FIG. 1. A high speed rotating primary disk 20, hereinafter referred to as a high speed "wheel," is positioned with one face parallel to the plane of a spectrograph slit (not shown), with its central axis 22 bisecting a line drawn lengthwise through the center of that slit. Wheel 20 has a slit 25 of the required dimensions (15 mm high by 0.8 mm wide) machined along a radius near the periphery of the wheel 20. A stationary mask 40 with second slit 45 is positioned in the plane of the original spectrograph slit, approximately 0.25 mm from the face of rotating wheel 20. The dimensions of slit 45 match those of slit 25 in rotating wheel 20. Wheel 20 is driven by an electric motor (not shown) coupled, through shaft 66, to a pair of spur gears 50 and 54 used to step up the speed of the motor.

When slit 45 in wheel 20 is positioned such that it is at the top of the wheel, it overlaps with stationary slit 45 and permits light to enter the spectrograph (not shown). The time period during which each differential element of stationary slit 45 is open to the passage of light (the "gate" time) is given by the time required for the rotating slit 25 to be swept by:

$$t_{open} = w/\omega R \quad (1)$$

In Eq.(1), $\omega$ denotes the rotational speed of the wheel 20, R is the radius 24 at the center of slits 25 and 45, and w is the rotating slit width 26. Due to space constraints in the instant spectrograph, the maximum possible wheel radius is approximately 49 mm, which, for a nominal slit height of 15 mm, restricts radius, R, 24 to approximately 40 mm. Designing for a nominal gate width of 10 μs, the rotational speed, therefore, must be greater than about 2000 $s^{-1}$ or 19,100 rpm.

A second constraint placed on the speed of wheel 20 is the chosen repetition rate of the laser. In order to function effectively wheel 20 must be synchronized to the repetition rate of the laser, in the present case, for example at a rate of 10 Hz. Thus the relation $$\omega/2\pi n = 10 \quad (2)$$

must be satisfied, where n takes on integer values. Other rate, however, are of course possible. Pairs of n and $\omega$ which satisfy Eq.(2) and the speed constraint $\omega > 2000$ $s^{-1}$ are tabulated in Table 1 below.

TABLE 1

Possible Fast Wheel Design Speeds

| N | ω[$s^{-1}$] | Rpm |
|---|---|---|
| 32 | 2011 | 19,200 |
| 33 | 2073 | 19,800 |
| 34 | 2136 | 20,400 |
| 35 | 2199 | 21,000 |
| Etc. | | |

A further consideration is the speeds of available mechanical shutters for the large format CCD (Charged Coupled Device) detectors employed in typical experiments. The shutter on the camera/detector used in the laboratory (Princeton Instruments LN/CCD-1024TKB) was measured to be at least partially open for a period of 37–38 msec. Thus, the mechanical camera shutter can only be used to mask out slit (25 and 45) overlap events that occur with a separation greater than about 20 msec. Slit overlap events for the speeds listed in Table 1 occur approximately every 3 msec, and thus must be reduced in frequency by at least a factor of 7.

This additional reduction in frequency is accomplished by use of a more slowly rotating secondary disk 30 (again hereinafter "wheel"), also shown in FIG. 1. This slower rotating wheel 30, is equipped with a large slot 35. The outside edge of wheel 30 comprises a set of gear teeth. Wheel 30 is caused to rotate by coupling it with a third spur gear 52 attached to common motor shaft 56. By carefully selection of gear sizes, wheel 30 can be driven at a speed which is an integer divisor of the speed of fast wheel 20, such that only every $m^{th}$ fast wheel 20 overlap event coincides with a slow wheel 30 overlap event, i.e., $$m = (\omega_{Fast}/\omega_{Slow}).$$

Of the possible design speeds enumerated in Table 1, factors such as available DC motor speeds, available gears of standard pitch, and gear train design to minimize wear must also be considered. Consideration of these additional factors resulted in the selection of the 21,000 rpm fast wheel speed, with a 3000 rpm slow wheel speed. Slow wheel 30 reduces the frequency of the overlap events from 350 Hz to 50 Hz, at which point the mechanical shutter on the camera can be employed to further reduce the overlap events to a 10 Hz rate. The two wheels 20 and 30 are driven by a third shaft 56 at 7500 rpm (shown in FIG. 1), which is directly coupled to a DC motor. At the 21,000 rpm fast wheel speed, the effective gate time, from Eq.(1), is 9.09 μs.

Motor Selection and Speed Control

Selection and sizing of the DC motor was ultimately based on such factors as overcoming aerodynamic drag between the spinning disk and a stationary cover wall, matching the available motor speed with the required gear ratio to drive wheels 20 and 30, and a means for controlling and maintaining the motor speed to the desired tolerance.

The aerodynamic drag was calculated to induce a torque of 1.6 mN-m. Accounting for gear reduction and typical spur gear efficiencies resulted in a required motor torque estimate of 5.6 mN-m, or, equivalently, a 4.4 W motor at 7500 rpm. In practice, bearing friction and gear train losses beyond the original estimates dominated, and the original 20 W motor purchased was not sufficient. From operation with the original motor, an estimated power requirement of 33 W was obtained, and the second motor purchased (Maxon RE035-071-33EAB200A) was rated at 90 W.

Controlling spurious electrical noise, however, represented a significant design obstacle. In order to set the exposure time and to synchronize shutter 10 with external equipment, the angular position of fast and slow wheels 20 and 30 must be sensed. With a switching power supply driving the DC motor, excessive electrical noise was introduced into the signals from the position sensors. By using of a filtered, linear DC power supply this electrical noise was significantly reduced, in particular, by filtering the linear supply with a standard RC filter, based on a 0.5 ohm resistor and 4700 $\mu$F. Further noise improvements can likely be obtained by using a choke on the motor leads, and by obtaining a motor with precious metal brushes. (The motor employed was only available from stock with graphite brushes). Alternatively, significant noise reduction may be achieved by obtaining an electronically commutated motor although unavailable from stock in power rating sizes greater than about 40 W.

As discussed below, a speed regulation of approximately 0.3% is required with the currently employed sensor and electronics configuration. This specification can be relaxed considerably by employing a second wheel position sensor, as discussed in the sensors and signal processing section.

Additional Mechanical Design Features

The central design concept has been described above. There are additional design features and details which the user should be aware of:

1) The mask with the stationary slit 45 is easily interchangeable. This allows rapid changing of the slit width and height, up to maximum values dictated by the dimensions of slit 25 in the fast wheel 20. Note that the effective gate time is solely determined by the width of slit 25 in the fast wheel 20.

2) The two rotating wheels 20 and 30 are enclosed within covers primarily to keep the shutter mechanism 10 and spectrometer clean and to prevent light from the optical wheel position sensors from entering the spectrograph.

Figure 1B:
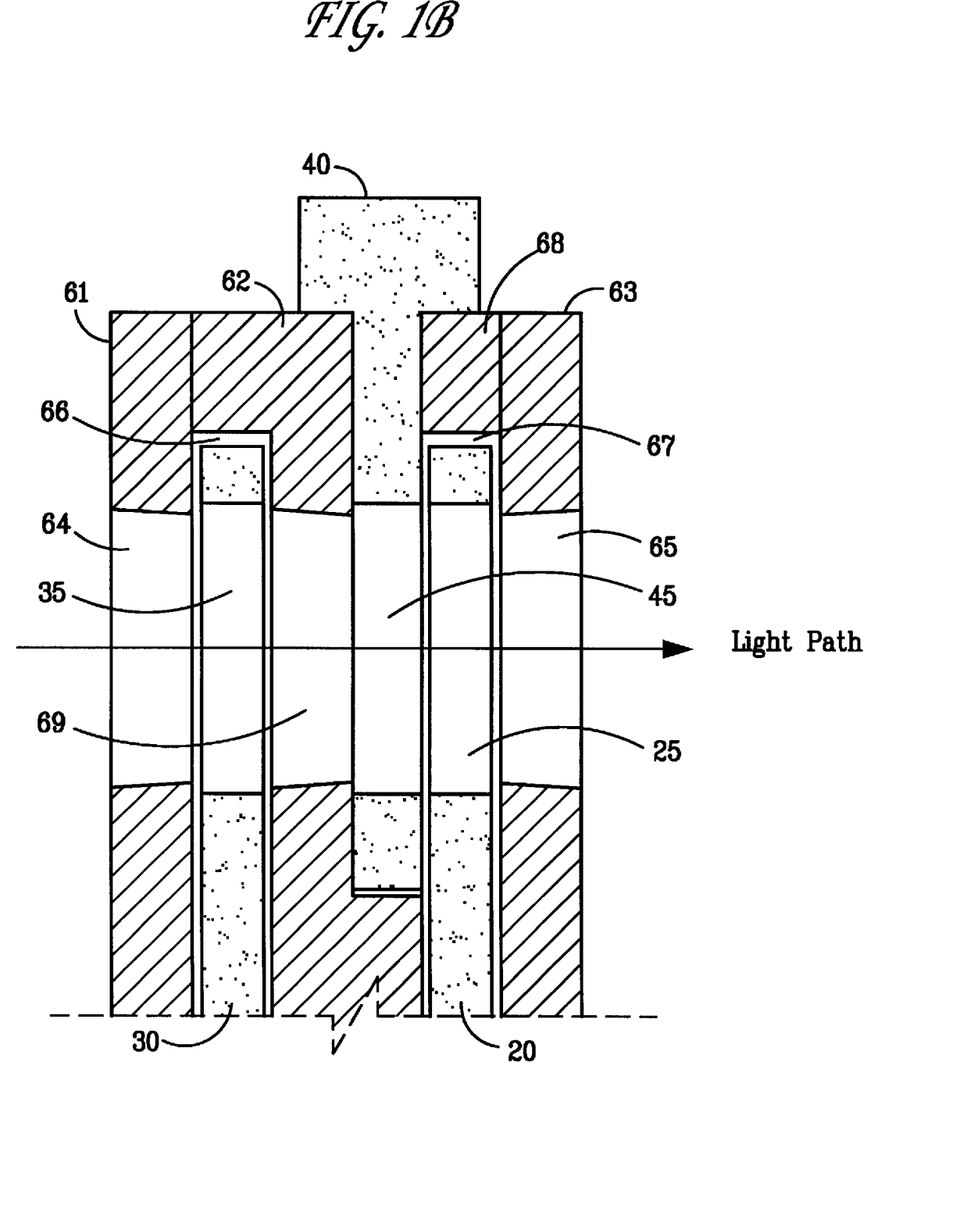
FIG. 1B. Illustrates a cross sectional view of the shutter components within a light control housing.
Figure 2A:
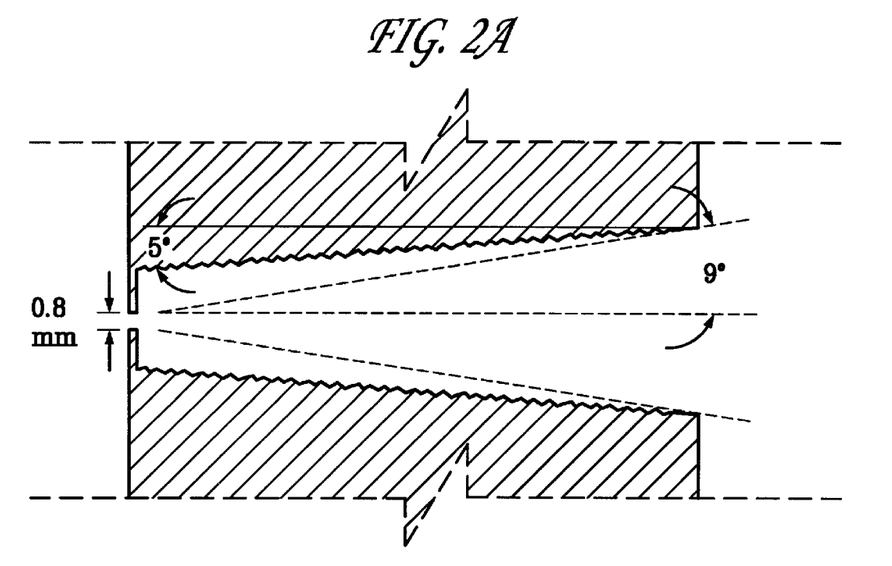
FIG. 2A. Illustrates a top view of the light passage opening through the shutter cover faces and the housing wall.
Figure 2B:
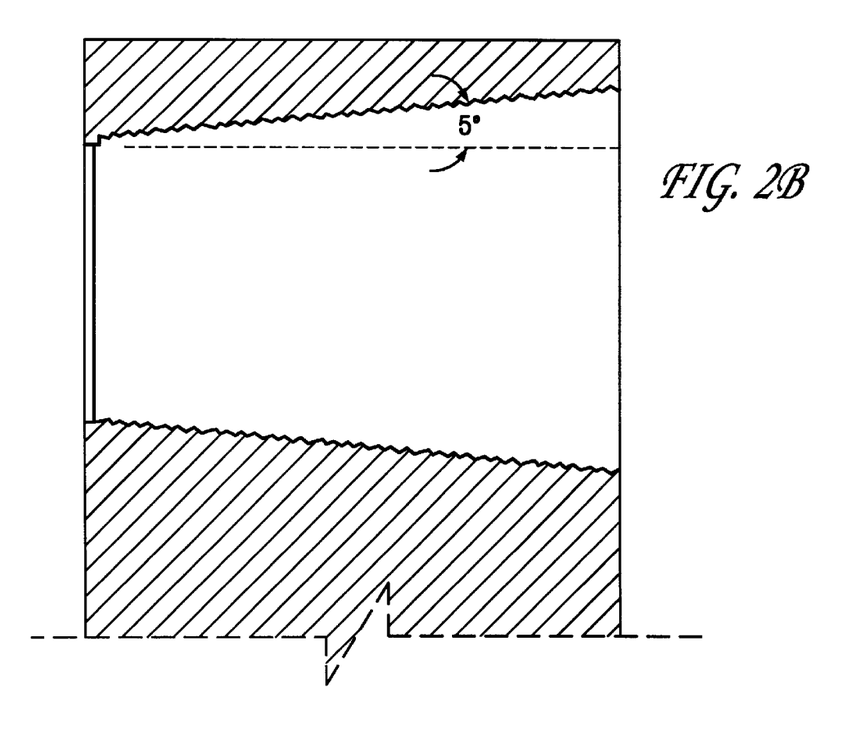
FIG. 2B. Illustrates a side view of the light passage opening through the shutter cover faces and the housing wall.

3) Stray light control measures—Each of the light passages, 64, 65, and 69 through the shutter 10, is designed to accommodate the f/4 optics needed to match the spectrograph, and is sketched in FIGS. 1B and 2. All parts along it are hard black anodized aluminum to help absorb stray light. A hard black anodized surface is etched deeper and is less reflective than a standard black anodized one. The parts affected are the front cover 61, housing 62, rear cover 63, slow wheel 30, stationary mask 40, and fast wheel 20. To eliminate light reflecting off the walls of light passage 65 and into slits 25 and 45. The 10° included angle of the light passage wall is terraced using a series of 15°×0.87 mm high undercuts where practical. Light approaching the 15° wall at a shallow angle is reflected into the bottom of the terrace where it is reflected out and away from the slits while light that is approaching nearly straight in is reflected off the terrace bottom, into the 15° side and out. This passage is also narrowed as it leads to the fast wheel 20 where it then expands at the same angle into the spectrometer interior. Note from FIG. 2 that the 9° half-angle horizontal plane from the edge of slits 25 or 45 to the front of light passage 65 is large enough to accommodate f/3.2 focusing optics. In the vertical plane, space constraints did not permit such a large half-angle, and a 5.5° angle was the largest that could be achieved. This implies that some light from the upper and lower 0.8 mm of slit 25 will be lost when f/4 focusing optics (which match the SPEX 270M) are used.

At the end of the light passage 64 in front cover 61, the light encounters slow wheel 30 which allows light to pass only when slot 35 aligns with light passage 64. The 0.5 mm clearance between slow wheel 30 wheel face and front cover 62 in conjunction with a minimal passage outline on the wheel face minimizes light leakage around the slow wheel 30 by forming a labyrinth through which the light must pass. Additionally, the cavity 66 within which slow wheel 30 rotates is isolated from fast wheel 20 cavity 67 by a wall 68 in housing 61. When the slow wheel slot 35 aligns with passage 64, light is allowed to penetrate this wall through another terraced passage 69 and arrive at stationary mask 40 and slit 45. The interface of this stationary but removable mask 40 with housing 61 is light tight, with respect to the inside of the spectrometer, by using a dovetail joint (not shown) on three sides that mate with housing to form a close fitting labyrinth seal. The fourth side of the mask is the insertion side that has a 0.25 mm clearance with a rectangular opening in the housing that forms a narrow crevice and terminates against a flat gasket 70 of black felt. Mask 40 is 1 mm thick at slit 45 and it is tapered with 10° included angle sides leading up to the slit which measures 0.8 mm wide by 15 mm high with 0.25 mm long straight sides.

Fast wheel 20 is the last obstruction for the light before it enters the spectrometer. Light is shining through slow wheel 30 and onto stationary mask 40 and fast wheel 20 for approximately 280° of fast wheel travel. Since slit 45 requires only 3° of wheel 20 rotation the other 277° of light is blocked from entering the spectrometer by a labyrinth seal formed around the edge of fast wheel 20. The clearance between the stationary mask 40 and fast wheel 20 is 0.25 mm for a minimum of 3.5 mm length and to further block the undesirable light the clearance between the wheel rim and housing is 1.25 mm and then 0.5 mm between the other wheel face and housing. Once the light passes through the slit 25 in fast wheel 20 it travels through a 10° terraced light passage 65 that widens out into the spectrometer interior.

As discussed below, the fast wheel 20 position is determined using a photodiode/LED pair. This sensor pair is located as far away from the light passage as practical to maximize the crevice length and thus absorb stray light from the LED heading for the light passage. Balancing pockets in fast and slow wheels 20 and 30 are made in the rear faces so no light scattering edges are produced in the light source side. Testing of the stray light control measures was performed by measuring light leakage of the LED around fast wheel 20 over a 50 second integration period. No evidence of any leakage could be observed.

Angular Position Sensing and Signal Processing
A. Timing Requirements

Figure 3:
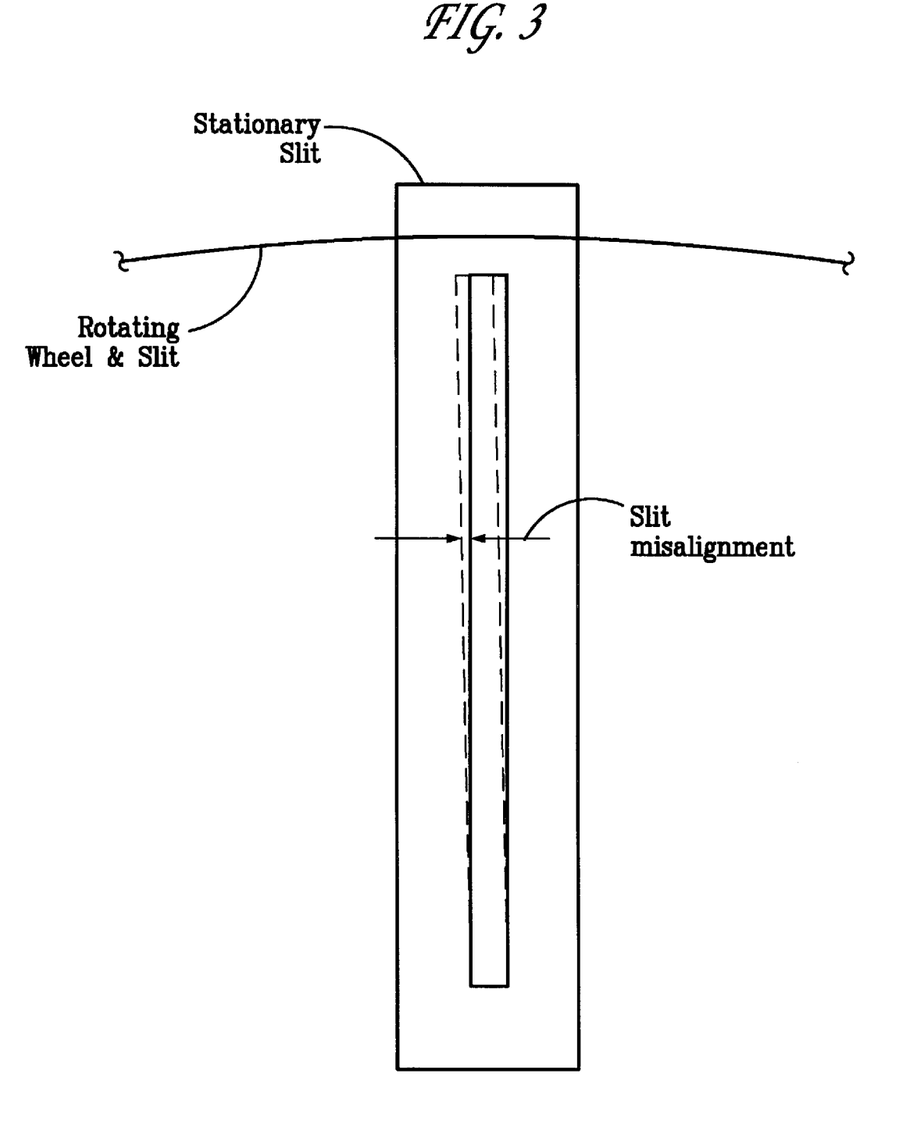
FIG. 3. Illustrates the maximum slit overlap misalignment.

Because the laser pulse (Q-switch) is to be synchronized with the slit overlap events, it is necessary to sense the (fast)

wheel position with a fairly high degree of precision. Timing requirements and associated wheel speed tolerances can be determined by specifying a maximum slit overlap misalignment considered acceptable (FIG. 3). Assuming that slit alignment of ±0.05 mm or better is required (approximately 0.070 or 0.6 $\mu$s), and that the wheel position is sensed 1 degree (about 8 $\mu$s) prior to slit alignment, then the required speed tolerance on fast wheel 20 is only about 7%.

The more stringent restriction on wheel timing arises from the requirement that the laser flash lamps be fired approximately 175 $\mu$s prior to the Q-switch. There are two possible timing scenarios when only a single position sensor is employed:

1) When the wheel position sensing occurs close to (~8 $\mu$s) slit alignment, the flash lamp timing must be based on the previous slit alignment/overlap event, which occurs about 2865 $\mu$s prior to the overlap event of interest. Assuming an acceptable tolerance of ±10 $\mu$s for the Q-switch delay of 175 $\mu$s, a speed tolerance of 0.37% is determined.

2) If the fast wheel position is sensed 175 $\mu$s or more before slit alignment, then the limiting timing requirement is determined by the desired slit alignment tolerance of 0.05 mm, giving a required speed tolerance of 0.6 $\|s/175$ $\mu s=0.34\%$.

In both cases the required speed tolerance is equivalent; the first case is deemed preferable however. In this situation, if the fast wheel speed is out of specification the laser pulse energy suffers but the measurement is made without error and the measured data is corrected for laser pulse energy in the data reduction process. In the second case, the light entering the spectrograph would be clipped by the misaligned slit. This clipping will not be easily detectable, and, if detected, difficult to correct for quantitatively.

An improvement to the current design would be to use two position sensors on fast wheel 20, one to control the laser flash lamps and the second to control the Q-switch. With this arrangement, the required speed tolerance can be reduced to approximately 5%.

The position of slow wheel 30 must also be sensed, to determine when slow wheel slot 35 is aligned with stationary and fast wheel slits 45 and 25, respectively. As with the dimensional tolerances of slow wheel 30 the timing requirements of the slow wheel need not be overly stringent.

B. Sensor Selection

Figure 4A:
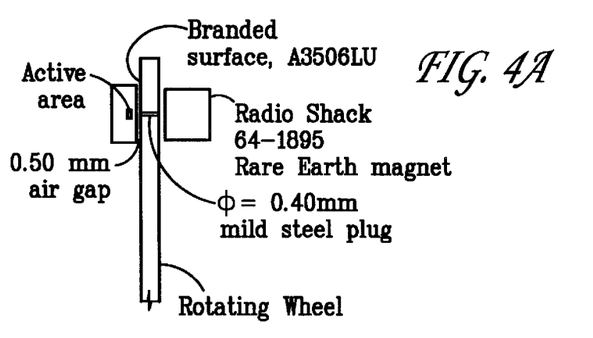
FIG. 4. Illustrates the Hall-effect transducer/magnet arrangement for sensing the low speed wheel position.
Figure 4B:
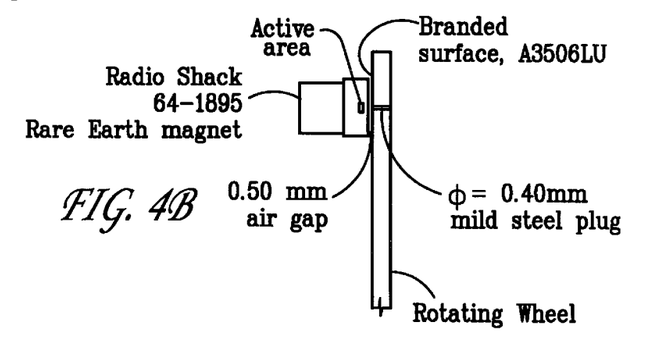

A Hall-effect transducer (Allegro A3506LU) sensor design is used for slow wheel 30 to sense the position of this rotating wheel. Two sensor/magnet configurations are generally available, and are shown in FIGS. 4a and 4b. Only the configuration of FIG. 4b, however, is possible due to the proximity of the larger fast wheel 20.

Figure 5:
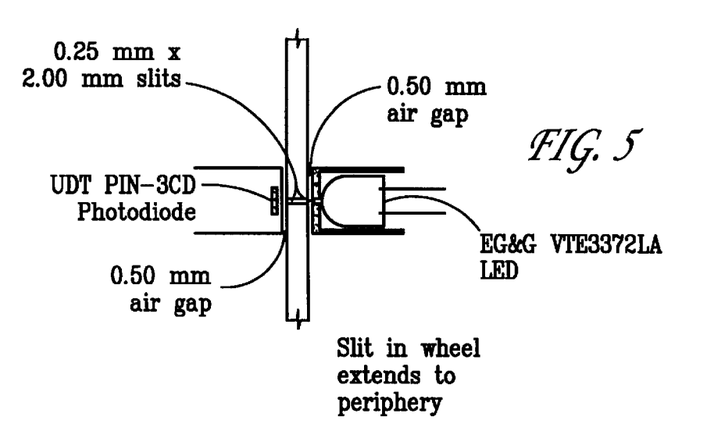
FIG. 5. Illustrates the LED/photodiode arrangement for sensing high speed wheel position.

The application of the Hall effect sensor was found to be impractical for the fast wheel position sensing principally due to eddy currents generated by the spinning (aluminum) wheel causing additional drag on fast wheel 20 requiring additional torque and a LED/photodiode based sensing technique was employed. The basic sensor geometry of the implemented sensor is shown in FIG. 5.

C. Signal Processing

Figures 10, 10A:
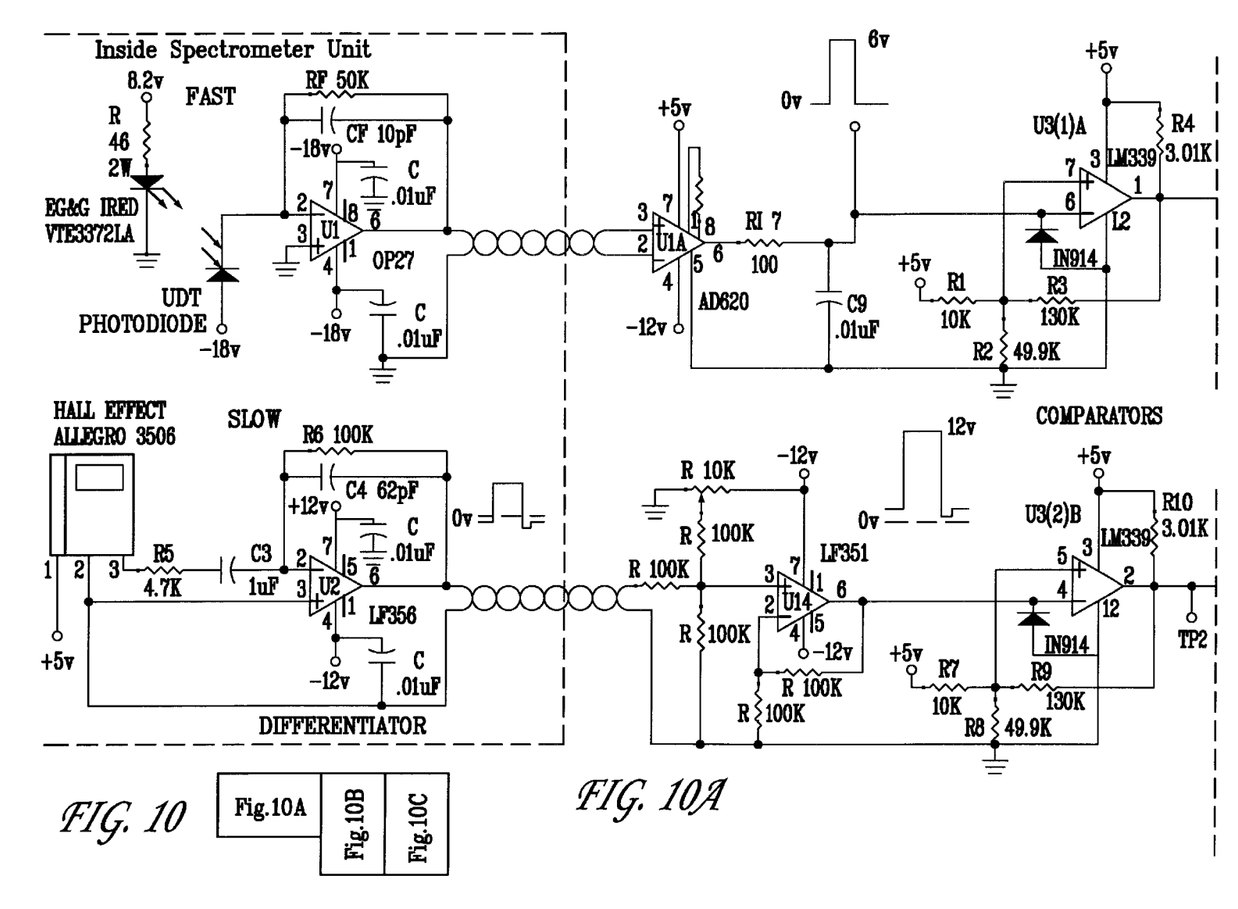
FIG. 10. Illustrates the circuit schematic for the shutter electronics.
Figure 10B:
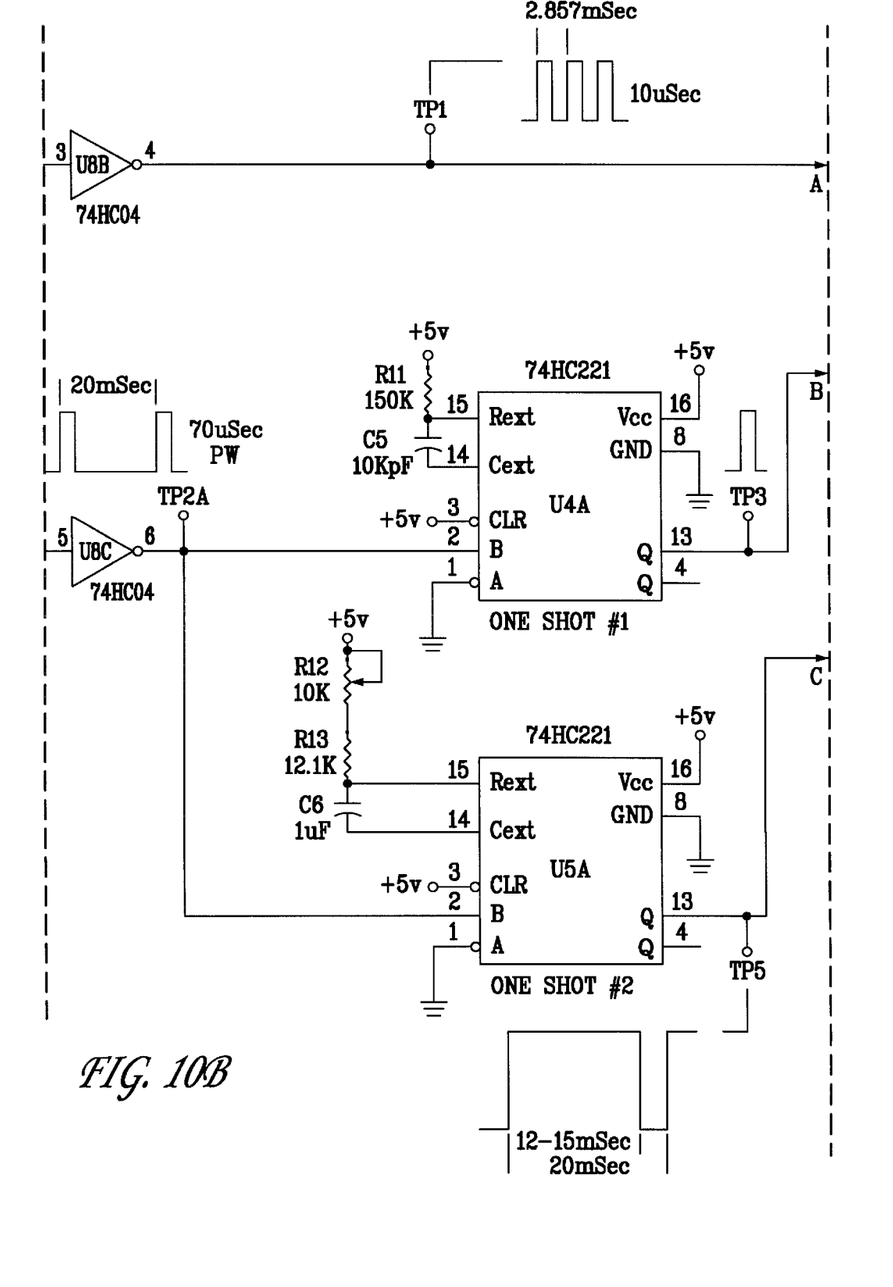
Figure 10C:
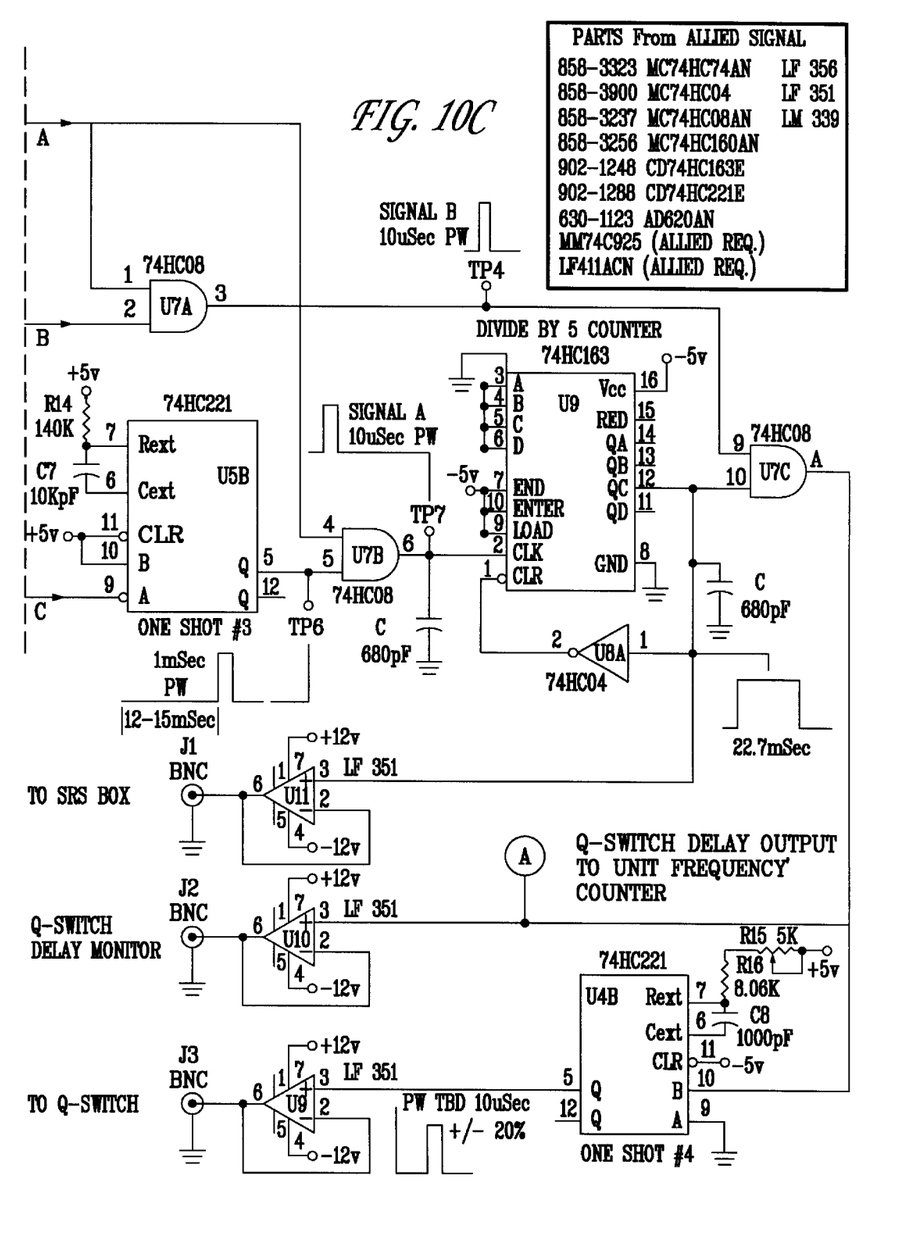

A schematic of the sensor signal processing circuitry is included in FIG. 10. In the following discussion, the operation of this circuitry is described qualitatively. References to specific integrated circuits (U1–U9) or test points (TP1–TP7) can be resolved by reference to the circuit schematic.

Fast Wheel

The LED used for the fast wheel position sensor (EG&G VTE3372LA) is a 3 mW (at 20 mA drive current) 880 nm LED which emits into a half power beam angle of ±10°. The 3 mm T-1 case permits compact packaging. To increase the signal levels, the LED is run at a drive current of 150 mA. This high drive current may have a detrimental effect on the life of the LED, and an improvement to the current design would be to replace the LED with a EG&G VTE3374LA, which is nominally rated at 5 mW at 20 mA and is also available in the same T-1 case. The LED is positioned in a housing which masks out the emitted light from all but a 2.00 mm by 0.25 mm area at the surface of fast wheel 20.

The detector employed is a UDT-PIN-3CD PIN photodiode, with a 1.27 mm by 2.54 mm active area which is well matched to the rectangular geometry of the LED mask and the small slot machined into the wheel edge. The detector mount is keyed to maintain alignment. The detector is mounted on a small circuit board which also contains the transimpedance amplifier in close proximity. This amplifier has a −3dB bandwidth of 320 kHz, corresponding to a 10–90% rise time of about 1 $\mu$s when responding to a step input. Note that detector bias and transimpedance amplifier power is provided by separate ±18V battery power supplies. This was done to help eliminate noise on the photodiode signal. With proper shielding and circuit layout, the photodiode and transimpedance amplifier can likely be operated from the same power supply as the rest of the analog electronics. The signal output of the transimpedance amplifier is of sufficient magnitude (approximately 1V peak) to permit transmission along cables where it is further amplified and processed in a separate signal processing unit. Note that although the detector mount is keyed, the small circuit board within the mount can currently rotate and should be potted firmly in place.

The separate signal processing unit contains an additional 6× amplifier (AD620 at U1A), followed by a Schmitt-input comparator (U3(1)A) used to generate a digital pulse. The comparator transition thresholds are set at 4.2V and 3.9 V, respectively. The output of the comparator is inverted to provide the waveform available at TP1.

Figure 6:
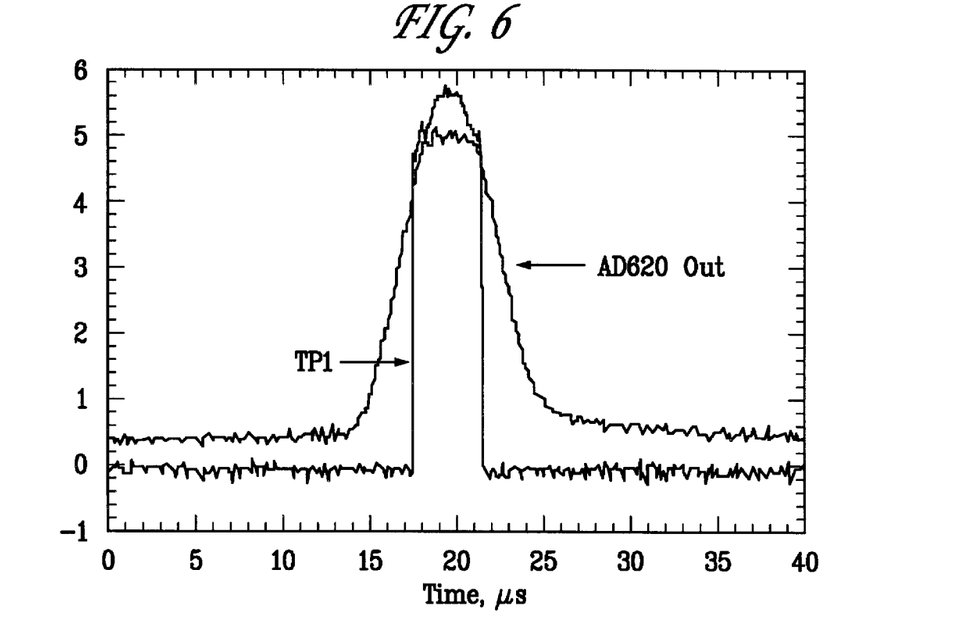
FIG. 6. Shows a typical timing signal for the high speed wheel.

A typical analog signal from the AD620 and its relationship to the TP1 waveform is provided in FIG. 6 for reference.

Slow Wheel

Figure 7:
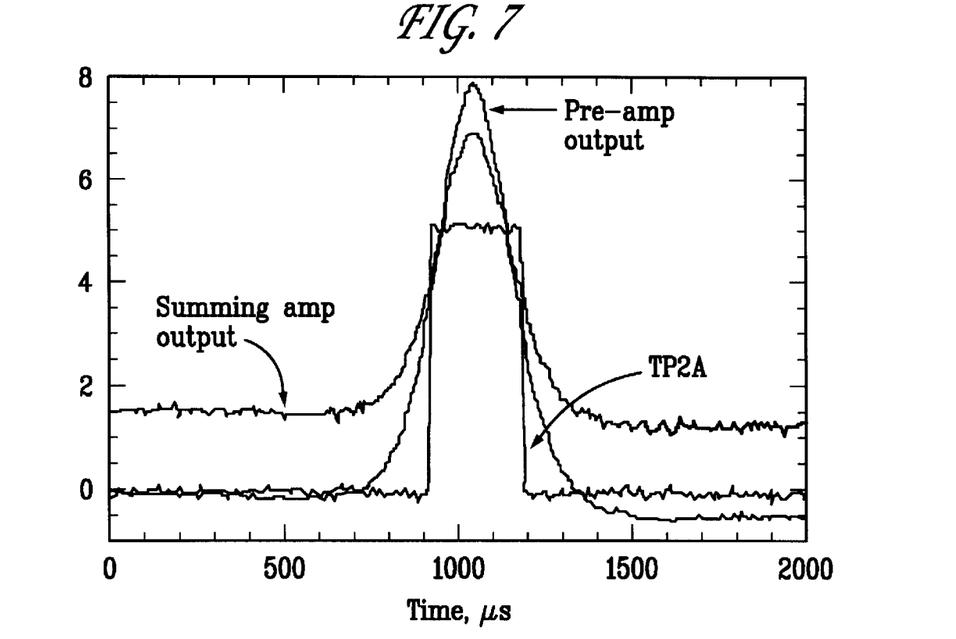
FIG. 7. Shows a typical timing signal for the low speed wheel.

The signal from the slow wheel Hall-effect position sensor is amplified by a band-pass pre-amplifier (U2) which removes the DC signal component, amplifies the signal, and rolls off the gain to minimize high-frequency noise. The bandwidth of this amplifier need not be particularly wide, and the gain is rolled off at approximately 20 kHz. The high-pass cut-off is 30 Hz. The amplified signal is sufficiently large (~8 V) to be transmitted to the separate signal processing unit. Due to the high-pass filtering of the band-pass pre-amplifier, the output can take on significant negative values just after the signal peak ( FIG. 7 ), which causes erratic behavior in the comparator circuit. This difficulty can be surmounted by reducing the high-pass cut-off frequency of the Hall-effect sensor pre-amplifier, or by injecting an offset voltage in a separate summing amplifier. The second solution was implemented (U14). The output of the summing amplifier is passed through a Schmitt comparator (U3(2)B) with thresholds set at nominal values of 4.2V and 3.9V. The comparator output is subsequently inverted to provide the waveform at TP2A. Typical signals from the output of the pre-amplifier, the output of the summing amplifier, and at TP2A are shown in FIG. 7 for reference.

Digital Logic

The waveforms derived from fast wheel 20 at TP1 and slow wheel 30 at TP2A form the basis for generating the pulses to control the laser flash lamps and Q-switch. As noted above, the purpose of slow wheel 30 is to reduce the frequency of the slit alignment/overlap events from 350 Hz to 50 Hz, at which point the camera's mechanical shutter can be implemented to further reduce the frequency to 10 Hz.

Figure 8:
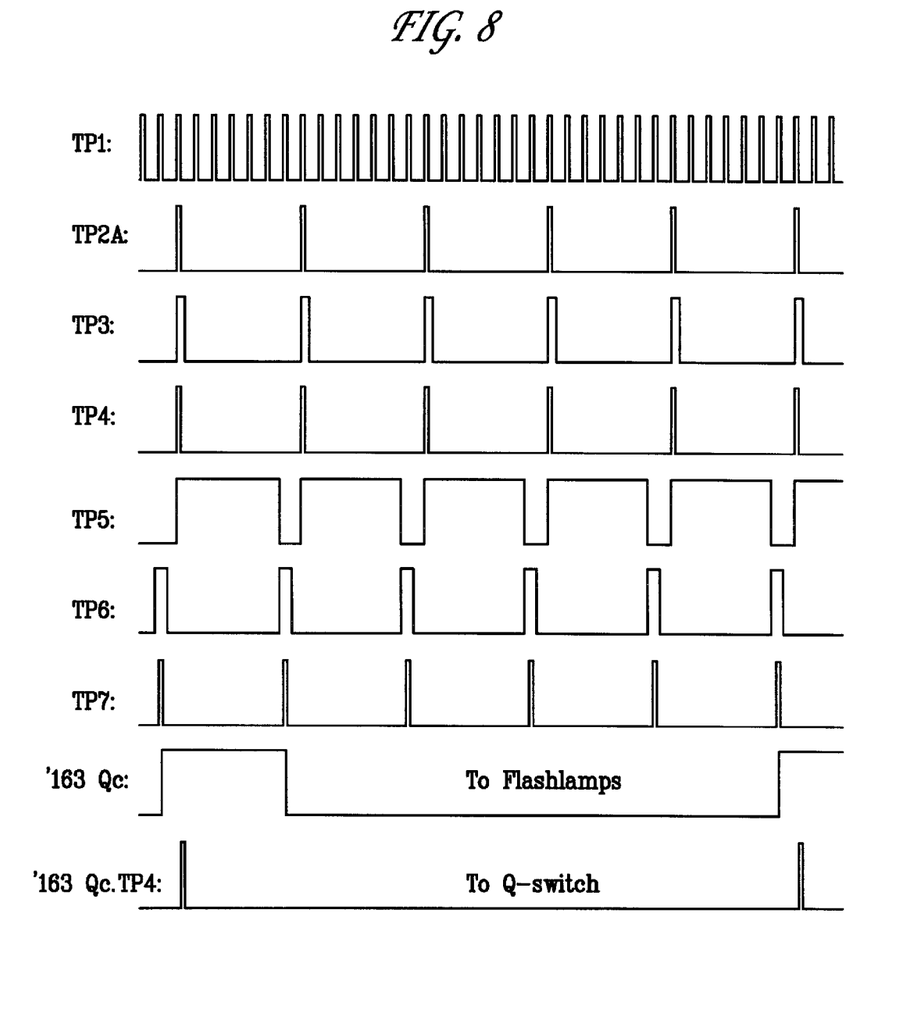
FIG. 8. The logic waveform progression.

The relevant signal waveforms are shown in FIG. 8. Signal processing consists of 3 separate tasks:

1) Selecting out the fast wheel pulse at TP1 that corresponds to a slit alignment overlap event coinciding with the overlap of slow wheel slot 35. This pulse will ultimately be used to trigger the laser Q-switch. This is accomplished by stretching the width of the slow wheel pulse from TP2A with the one-shot at U4A, and logically ANDing the result (TP3)with TP1 to give the waveform at TP4.

2) Selecting out the TP1 pulse immediately prior to the one selected to trigger the Q-switch. This pulse will ultimately be used to trigger the laser flash lamps. This is accomplished by stretching the TP2A pulse beyond the next six TP1 pulses using the one-shot at U5A, and using the falling edge of this pulse (TP5) to trigger U5B. The pulse output of U5B (TP6) is used to select the appropriate pulse from TP1 to give the waveform at TP7. The pulse widths of the waveforms at TP5 and TP6 are adjustable via trim potentiometers on the circuit board.

3) Dividing the frequency of the waveforms at TP4 and TP7 by 5, to obtain 10 Hz signals suitable for triggering the laser. This is accomplished using the Divide-by-5 counter U9.

Figure 9:
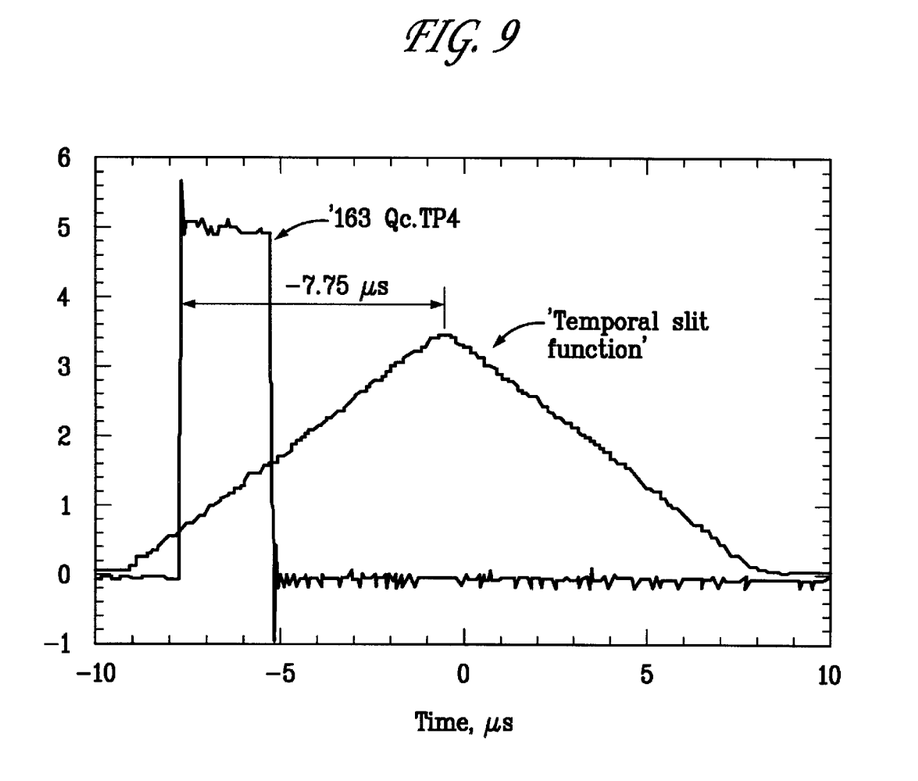
FIG. 9. The time delay from the Q-switch trigger to slit overlap.

The Q-switch trigger is nominally advanced from the exact slit overlap time by 8 $\mu$s. The exact timing can be found by uniformly illuminating the slit (as they overlap), collecting the light passing through the slits, and focusing it onto a photodiode. The delay should not be subject to drift provided: i) the battery or other power supply voltage supplying the photodiode bias and pre-amplifier do not change, and ii) the alignment of the photodiode does not shift. To maintain stable alignment the circuit board on which the photodiode and pre-amplifier are mounted should be potted firmly in place. Sample timing waveforms are shown in FIG. 9. The required delay from the Q-switch trigger is nominally stable at about 7.75 $\mu$s, as seen in FIG. 9. By timing the interval between consecutive rising edges of waveform '163Qc, the fast wheel speed may be sensed and displayed to allow accurate setting of the wheel speed and effective exposure time.

What is claimed is:

1. A high speed shutter mechanism for synchronizing the operation of an external device, comprising:

a high speed wheel, comprising:
      a first disk, said first disk having a first narrow, rectangular opening, said opening having a length and a width, said opening extending along either side of a radius of said first disk; and
      a central shaft fixedly attached to said first disk about which said first disk rotates; and
   a fixed mask, comprising:
      a second narrow, rectangular opening, said second opening having a length about equal to, and a width less than to about equal, said first opening, said mask arranged above and in a first plane parallel to said first disk such that when said first disk rotates said first and said second openings align along said first disk radius once with each rotation;
   a low speed wheel, comprising:
      a second disk, comprising gear teeth disposed along an outside parameter of said second disk;
      a central shaft fixedly attached to said second disk about which said second disk rotates;
      a large slot, said slot comprising a sector of an annulus of said second disk wherein said sector has a width wider than said first opening, said large slot extending on either side of a radius of said second disk, said second disk lying in a second plane parallel to said first plane, said first opening and said large slot aligning with said second opening every m$^{th}$ rotation of said high speed wheel when said high speed wheel rotates at an angular speed which an integer multiple, m, of an angular speed of said low speed wheel; and
   means for simultaneously driving the rotation of said high speed wheel and said low speed wheel, comprising:
      an electric motor, said motor having a drive shaft and first and second spur gears fixedly attached to said motor drive shaft; and
      a third spur gear fixedly attached to said central shaft of said high speed wheel, wherein said first spur gear engages said third spur gear, and said second spur gear engages said gear teeth along said low speed wheel parameter.

2. The high speed shutter mechanism of claim 1, wherein said electric motor is electronically commutated.

3. The high speed shutter mechanism of claim 1, wherein the electric motor is driven by a filtered, linear DC power supply.

4. The high speed shutter mechanism of claim 1, wherein said means for driving further comprises a feedback controlled speed controller.

5. The high speed shutter mechanism of claim 1, wherein said alignment of said first and second openings and said large slot is synchronized with an operation of an external peripheral device.

6. The high speed shutter mechanism of claim 5, wherein said external peripheral equipment comprises a light source and a camera means.

7. The high speed shutter mechanism of claim 1, wherein the relative positions of said first and second wheels and said mask are actively sensed such that an effective shutter exposure time can be determined, said effective exposure time equal to the interval of time necessary for said first opening to traverse said second opening.

8. The high speed shutter mechanism of claim 1, wherein the high speed wheel further includes means for sensing an angular position of said first disk.

9. The high speed shutter mechanism of claim 1, wherein the low speed wheel further includes means for sensing an angular position of said second disk.

10. The high speed shutter mechanism of claim 8, wherein said means for sensing includes an LED and a photodiode, said LED and said photodiode positioned on either side of said first disk near said disk periphery along a common line perpendicular to said first disk.

11. The high speed shutter mechanism of claim 9, wherein said means for sensing comprises a Hall-effect transducer, a magnet, and a small ferrous plug, said plug inserted through and fixed to said second disk, said plug set flush with a top and a bottom surface of said second disk, said Hall effect transducer and said magnet centered over and coaxial with said ferrous plug.

12. The high speed shutter mechanism of claim 8, wherein the angular position of said first disk is sensed at two distinct times during each revolution of said first disk.

13. The high speed shutter mechanism of claim 11, wherein processing of the signal from said Hall-effect transducer comprises a pre-amplifier, an offset voltage injection via a summing amplifier, and digitization via a Schmitt input comparator.

14. The high speed shutter mechanism of claim 1, wherein the interval of time necessary for said first opening to traverse said second opening is less than ten microseconds.

15. The high speed shutter mechanism of claim 1 further comprising a light control means, said light control means comprising a housing, a front cover and a rear cover surrounding and enclosing said high speed shutter mechanism, said light control means further including first, second, and third light passages for allowing light rays to pass through said light control means when said first and second narrow, rectangular openings align with said large slot and said light passages.

16. The high speed shutter mechanism of claim 15, wherein said light control means prevents light rays from passing through said light control means when said first and second narrow, rectangular openings, and said large slot are not aligned.

17. The high speed shutter mechanism of claim 16, wherein said housing, a front cover and a rear cover further comprises hard black anodized surfaces to absorb stray light.

18. The high speed shutter mechanism of claim 16, wherein said first, second, and third light passages are angled and terraced to eliminate light rays that are not normal, or nearly normal, to said front and rear covers from entering said light passages.

19. A high speed shutter mechanism for synchronous laser spectroscopy, comprising:

a high speed wheel having an axis and a peripheral edge distal to said high speed wheel axis, said axis comprising a shaft about which said high speed wheel rotates at a first speed, said high speed wheel further having a narrow rectangular first slit extending to either side of a first radius from a point near said high speed wheel periphery to a point between said wheel periphery and said high speed wheel axis;

a fixed mask having a second narrow rectangular slit, said second slit having a width equal to, and a length less than, said first slit, said mask arranged above and in a first plane parallel to said high speed wheel such that when said high speed wheel rotates said first and said second slits align along said first radius once with each rotation;

a low speed Wheel having an axis and a peripheral edge distal to said low speed wheel axis, said low speed wheel axis comprising a shaft about which said low speed wheel rotates at a second speed, said low speed wheel having a large slot, said large slot extending on either side of a radius of said low speed wheel from a point near the periphery of said low speed wheel to a point between said periphery and said low speed wheel axis; said slot comprising a sector of an annulus of said low speed wheel wherein said sector has a width which is wider than either of said first or said second slit, said low speed wheel arranged between said high speed wheel and said mask in a second plane parallel to said high speed wheel such that when said high speed wheel and said low speed wheel rotate said first slit and said slot align with said second slit only every $m^{th}$ rotation of said high speed wheel, wherein m is an integer multiple of said first speed divided by said second speed; and means for simultanously driving said high speed wheel and said low speed wheel, wherein said means comprises:

an electric motor, said motor having a drive shaft and first and second spur gears fixedly attached to said motor drive shaft; and a third spur gear fixedly attached to said shaft of said high speed wheel, wherein said first spur gear engages said third spur gear, and said second spur gear engages gear teeth disposed along said peripheral edge.

* * * * *